United States Patent [19]

Hanaoka et al.

[11] 4,032,067
[45] June 28, 1977

[54] THERMOSTAT VALVE

[75] Inventors: Masanori Hanaoka, Toyota; Masao Inagaki, Okazaki, both of Japan

[73] Assignee: Toyota Jidosha Kogyo Kabushiki Kaisha, Toyota, Japan

[22] Filed: Dec. 11, 1975

[21] Appl. No.: 639,973

[30] Foreign Application Priority Data

Aug. 4, 1975 Japan .................... 50-107963

[52] U.S. Cl. .................................... 236/34.5; 74/534
[51] Int. Cl.² ......................................... F01P 7/02
[58] Field of Search .................. 236/34, 34.5, 100; 74/503, 529, 532, 534, 537, 538

[56] References Cited

UNITED STATES PATENTS

| | | |
|---|---|---|
| 2,356,958 | 8/1944 | von Wangenheim ............ 236/34 |
| 2,881,616 | 4/1959 | Clifford et al. .................. 236/34 X |
| 2,919,069 | 12/1959 | Freismuth ...................... 236/34 |
| 2,931,576 | 4/1960 | Freismuth ...................... 236/34 |
| 2,981,478 | 4/1961 | Salmon ........................... 236/34 |
| 3,092,322 | 6/1963 | Schwarz ......................... 236/34.5 |
| 3,207,436 | 9/1965 | Jones .............................. 236/34 |
| 3,300,134 | 1/1967 | Wahler ............................ 236/34 |

Primary Examiner—William E. Wayner
Assistant Examiner—William E. Topolcai, Jr.
Attorney, Agent, or Firm—Birch, Stewart, Kolasch and Birch

[57] ABSTRACT

A thermostat valve of the type actuated by a wax cylinder incorporating a needle piston, wherein the diameter of said needle is reduced at least at a portion thereof which is received in a bore of the wax cylinder.

2 Claims, 4 Drawing Figures

THERMOSTAT VALVE

BACKGROUND OF THE INVENTION

1. Field of the Invention

The present invention relates to a thermostat valve and, more particularly, a thermostat valve of the type which utilizes the reversable expansion and contraction of a thermally expandable material such as wax for operating a valve member between its open and closed positions.

2. Description of the Prior Art

As a thermostat valve of the aforementioned type, there is known a thermostat valve comprising a housing having a valve seat portion which defines a valve port, a valve member adapted to cooperate with said valve seat portion to selectively open or close said valve port, a casing member containing a thermally expandable material such as wax and providing a cylindrical bore, and a needle partially received in said bore so as to be slidable therealong and driven by said thermally expandable material relative to said casing member due to the thermal expansion of said material, wherein either said casing member or said needle is connected to said housing while the other is connected to said valve member.

The thermostat valve of this type is mounted, for example, at the cooling water outlet port of a water jacket of the automobile engine for the purposes of controlling the cooling water temperature in its water cooling system. In this case, when the cooling water temperature is low, the valve is closed to close the cooling water outlet port of the water jacket thereby obstructing the flow of cooling water from the water jacket toward the radiator while, when the cooling water temperature increases, the valve is opened to open the cooling water outlet port thereby allowing the cooling water to flow from the water jacket toward the radiator.

In the conventional thermostat valve of the abovementioned type, the needle is formed as a straight rod member having a uniform cross section, said rod member being relatively, closely received in said bore without leaving any substantial clearance between the sliding surfaces of the two relative slidable members. In this case, when the valve has been used for a long time, the friction shavings generated from a rubber piston, a resin plate, etc., provided in said bore, the fur in the cooling water, etc. accumulate between the needle and the bore thereby increasing the slide resistance of the needle and causing misoperation so that even when the thermally expandable material is contracted, the needle is not retracted thereby keeping the valve in its opened condition. If such as misoperation occurs in a thermostat valve provided in the engine cooling system of an automobile, the cooling water temperature is not properly maintained in the winter season, causing overcooling of the cooling water, whereby the startability of the engine and the fuel consumption become poor and the sufficient heating of the cabin is obstructed.

Furthermore, if a portion of the thermally expandable material leaks out of the casing member as a result of an overexpansion thereof due to overheating caused by an extrodinarily high temperature of the engine cooling water caused by some problem in the engine, then the valve will not be sufficiently opened in a subsequent normal operation, whereby chronic overheating of the engine will occur and, in an extreme case, very serious damage such as burn sticking of the engine will be caused.

SUMMARY OF THE INVENTION

Therefore, the object of the present invention is to solve the abovementioned drawbacks in the conventional thermostat valve of the abovementioned type and to provide an improved thermostat valve in which the abovementioned problems caused by friction shavings, etc. is not encountered thereby ensuring a positive valve operation for a long period of service time and, in addition, if a leakage of the thermally expansible material does occur, the valve is held in its fully opened condition to avoid the danger of causing overheating of the engine.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the above-mentioned object is accomplished by a thermostat valve comprising a housing having a valve seat portion which defines a valve port, a valve member adapted to cooperate with said valve seat portion to selectively open or close said valve port, a casing member containing a thermally expandable material and providing a cylindrical bore and a needle partially received in said bore so as to be slidable therealong. The needle is driven by said thermally expandable material relative to said casing member due to the thermal expansion of said material, one of said casing member and said needle being connected to said housing while the other is connected to said valve member. According to the improvement as defined by the present invention, the needle is reduced in its diameter at least at a portion thereof which is received in said bore.

In the abovementioned structure, the portion of the needle where the diameter is reduced provides a substantial clearance between the needle and the cylindrical surface of the bore, such a clearance serving as a space which advantageously collects the friction shavings generated from the rubber piston, resin plate, etc., or the fur in the cooling water, whereby the collection of foreign materials between the needle and the bore, which increases the slide resistance of the needle with respect to the bore, is eliminated. Furthermore, if the thermostat valve has been subjected to an extraodinarily high temperature due to some particular problem, the needle is driven beyond a standard stroke to such an extent that a shouldered portion which defines the end of the reduced portion of the needle is latched at the open edge portion of the bore thereby holding the needle in its shifted position, thus maintaining the valve in its fully opened position even when the thermally expansible material has contracted. Therefore, even when a portion of the thermally expandable material has leaked out of the casing member because it has temporarily been subjected to an extraordinarily high temperature, the thermostat valve fails in its opened position.

Therefore, when the thermostat valve according to the present invention is used as the valve for controlling the cooling water temperature in the engine cooling system of an automobile, it is ensured that even when a leakage of the thermally expandable material has occurred due to overheating of the thermostat valve, the engine is protected from being seriously damaged by, for example, burn sticking.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
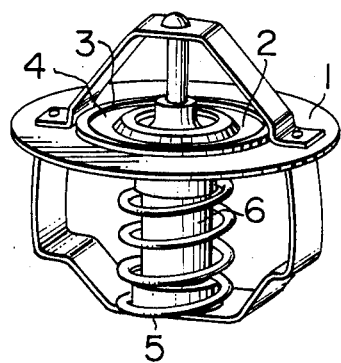
FIG. 1 is a perspective view showing an embodiment of the thermostat valve according to the present invention.

Referring to the accompanying drawing, 1 designates a valve housing having a valve seat portion 3 which defines a valve port 2. Element 4 is a valve member which cooperates with said valve seat portion to selectively open or close said valve port 2. The valve member 4 is constantly urged upward in the figure to close the valve by compression coil spring 5 mounted between the valve member and the housing. A casing member 6 is mounted to the valve member 4 to form a unitary element therewith, said casing member being a vessel opened at its upper end, said open end being closed by a flange portion of a guide member 7 thereby defining a chamber space therein, said space being filled with a thermally expansible material 8 such as wax. The guide member 7 includes an axially elongated portion extending along the central axis of the vessel-like casing 6 and has a cylindrical bore 9 formed in said elongated portion to be substantially in alignment with the central axis of the casing member 6. In the bore 9, a needle 10, a resin plate 11 and a rubber piston 12 are inserted in series in a manner to be movable along the central axis of the bore. The needle 10 is connected with the housing 1 at its upper projecting end portion. A portion of the needle received in the bore 9, i.e., a portion of a predetermined length located adjacent the lower end of the needle is formed as a reduced portion 10' having a diameter substantially smaller than that of the remaining portion at which the needle slidably engages the cylindrical surface of the bore, thus forming a substantial clearance between the needle and the cylindrical surface of the bore.

Figure 2:
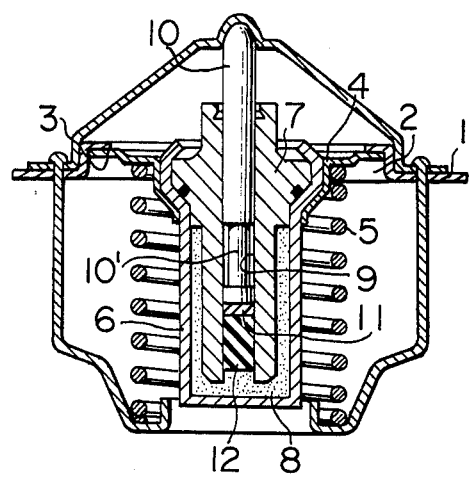
FIG. 2 is a longitudinal section of the thermostat valve shown in FIG. 1.

When the thermostat valve is subjected to a low temperature, the valve is in the condition as shown in FIG. 2, wherein the thermally expansible material 8 is contracted and the valve member 4 is in engagement with the valve seat portion 3 under the action of the compression coil spring 5, thereby closing the valve. When the casing member 6 has been heated by, for example, cooling water of the engine, the thermally expandable material 8 contained in the casing member expands and urges the rubber piston 12 upward.

The rubber piston 12 in turn urges the needle 10 by way of the resin plate 11 upward relative to the casing member 6, whereby by the reaction thereof the casing member 6 and the valve member 4 are urged downward against the spring force of the compression coil spring 5. Thus, the valve member 4 is removed from the valve seat portion 3, thereby opening the valve port 2. When the ambient temperature of the casing 6 lowers with the result that the thermally expandable material 8 contracts, the valve member 4 is urged upward by the compression coil spring 5 according to the contraction of the thermally expandable material until it finally abuts against the valve seat portion 3 where it closes the valve port 2.

Figure 3:
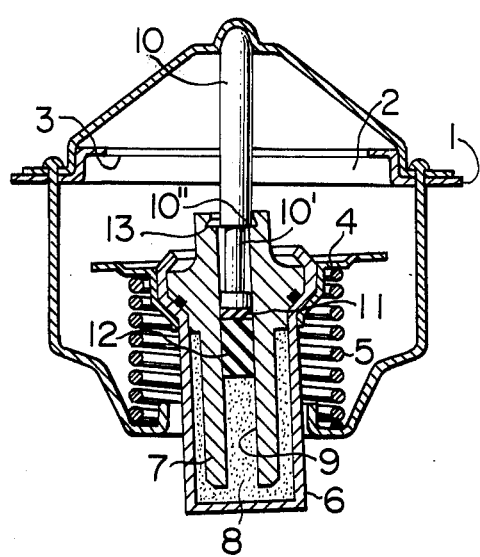
FIG. 3 is a longitudinal section similar to FIG. 2 but showing the condition wherein the valve is fully opened under an extraordinarily overheated condition; and, FIG. 4 is a side view of a needle which is a modification of the needle incorporated in the valve shown in FIGS. 2 and 3.
Figure 4:

If the thermally expandable material 8 has expanded extraordinarily due to overheating caused by some trouble in the system including the thermostat valve, the needle 10 is urged upward as shown in FIG. 3. In such a case, there is a danger that the portion of the thermally expandable material might leaks out of the casing member 6 due to the extraordinarily high pressure generated in the casing member. Such a loss of the thermally expandable material would inevitably cause an over contraction of the thermally expandable material in the subsequent operation of the thermostat valve as mentioned above. However, as shown in FIG. 3, when the needle 10 has once been overshifted relative to the casing member 6 to such an extent that a shouldered portion 10" which defines the upper end of the reduced portion 10' traverses the upper open edge 13 of the bore 9, the shouldered portion 10" engages the edge 13, whereby the retraction of the needle into the bore is obstructed. Thus, the valve is thereafter maintained at its fully opened position. The needle may be provided with two or more reduced portions spaced along the axial direction thereof as exemplarly shown in FIG. 4.

Although the present invention has been described and illustrated with reference to a particular embodiment of the thermostat valve which is closed by a spring means and opened by the expandable of a thermally expansible material, the present invention can also be applied to a valve which is closed by the expansion of the thermally expandable material. Therefore, it is to be understood that the present invention is not limited to the particular embodiment described hereinabove and shown in the accompanying drawing and various modifications can be made by those skilled in the art without departing from the spirit of the present invention.

We claim:

1. A thermostat valve comprising a housing having a valve seat portion which defines a valve port, first and second supporting frame portions provided at opposite sides of said valve seat portion, a valve member adapted to cooperate with said valve seat portion to selectively open and close said valve port, a casing member provided with a centrally disposed cylindrical bore, said casing member containing a thermally expandable material therein, said centrally disposed cylindrical bore communicating with said thermally expandable material and carrying said valve member, a coil spring which elastically and slightly, tiltably supports said casing member against said first supporting frame portion in a manner so that said valve member carried by said casing member is elastically engageable onto said valve seat portion, and a needle member having one end portion thereof disposed in said bore so as to be slideable therealong and adapted to be driven out of said bore by said thermally expandable material in accordance with the thermal expansion thereof, the other end portion of said needle being pivotably supported by said second supporting frame portion in a manner so that said valve member carried by said casing member is adapted to be moved away from said valve seat portion under the reaction applied by said needle member driven out of said bore due to the thermal expansion of said thermally expandable material, wherein a shoulder portion is formed in a part of said needle member disposed in said bore by reducing a part of said needle member, said shoulder portion being adapted to engage with an outer edge of said bore when said needle has been driven out of said bore beyond a predetermined distance.

2. The thermostat valve of claim 1, wherein said shoulder portion is located at substantially one-third of its total length from its end disposed in the bore.

* * * * *